Dec. 1, 1970  P. BANHART  3,543,405
APPARATUS FOR DENTAL TREATMENT
Filed Nov. 18, 1968  9 Sheets-Sheet 3

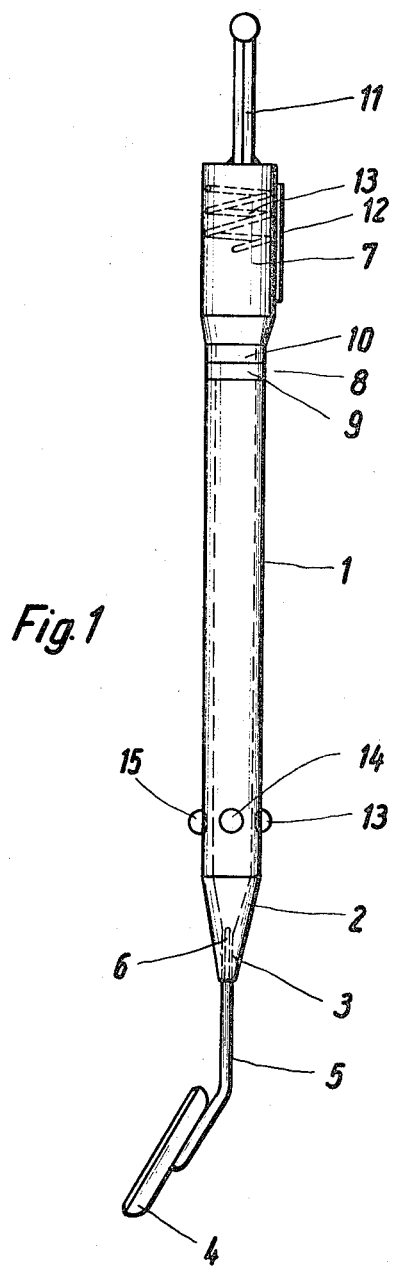

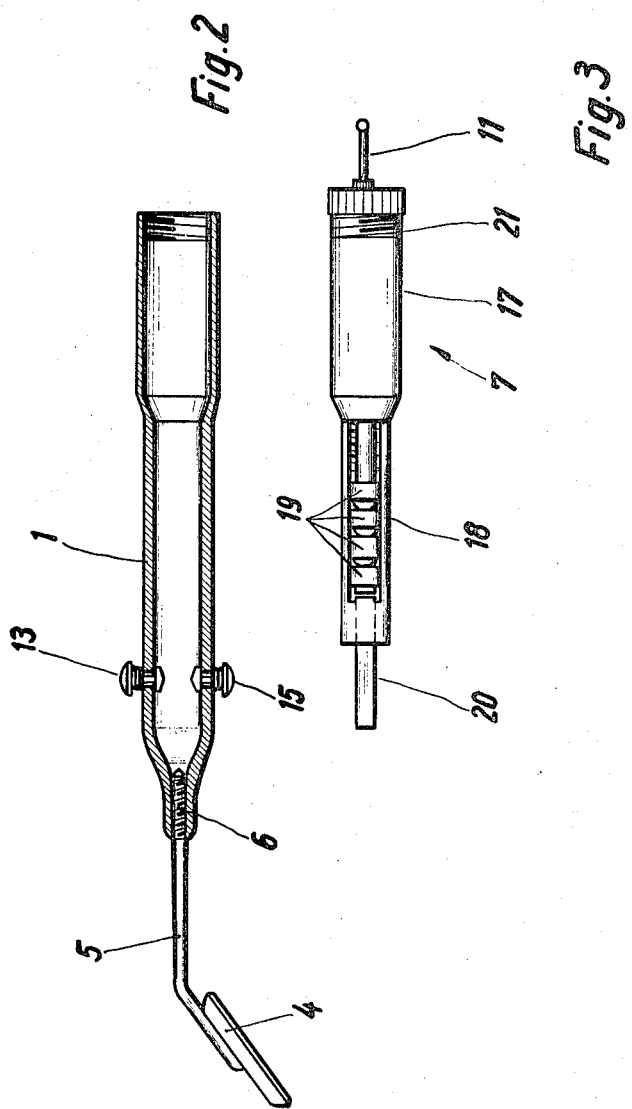

Inventor:
Peter Banhart
By Walter Becker

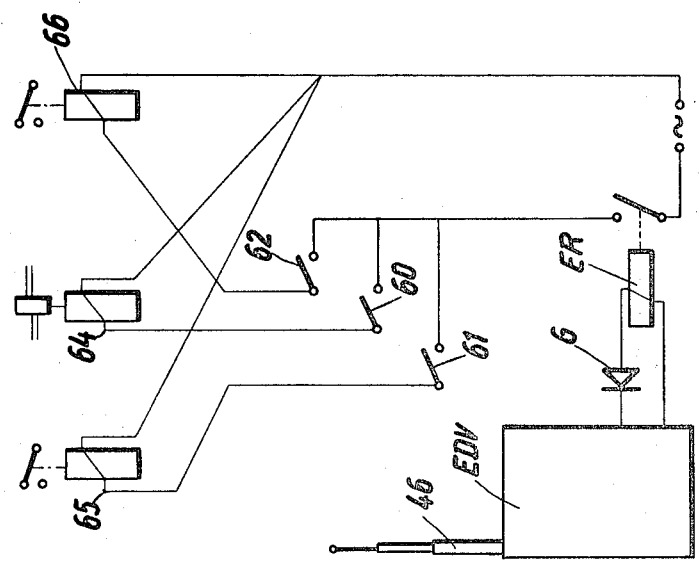
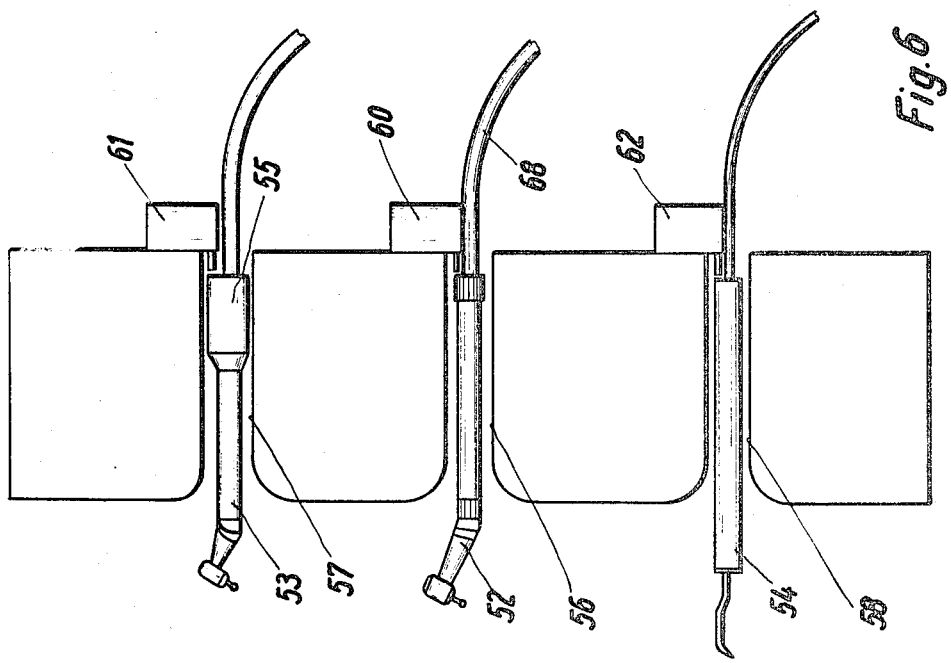

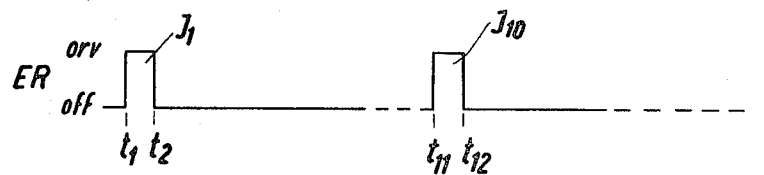
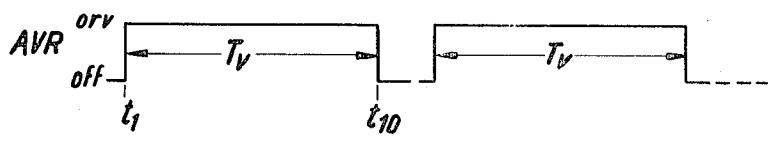
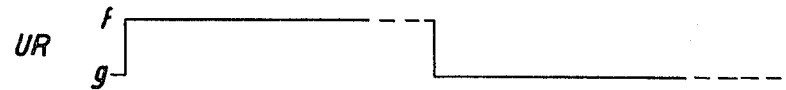
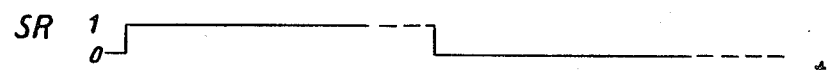
Fig. 9a
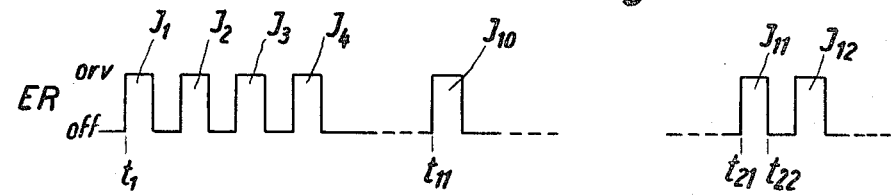
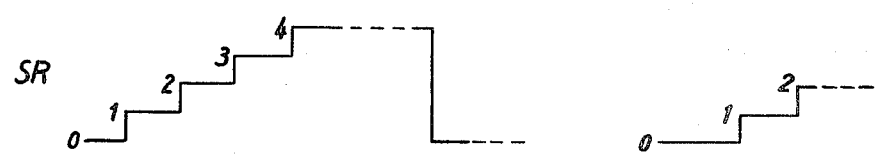
Fig. 9b

Inventor:
Peter Banhart

United States Patent Office 3,543,405
Patented Dec. 1, 1970

3,543,405
APPARATUS FOR DENTAL TREATMENT
Peter Banhart, 27 Marktstrasse, 7 Stuttgart-
Bad Canstatt, Germany
Filed Nov. 18, 1968, Ser. No. 776,554
Claims priority, application Germany, Nov. 16, 1967,
1,566,195; Feb. 9, 1968, 1,616,126
Int. Cl. A61c 1/08
U.S. Cl. 32—26                                27 Claims

ABSTRACT OF THE DISCLOSURE

A remote control means including a transmitter and a receiver for wireless dental treatment apparatus permitting drive and speed variation by a dental operator free to move with minimum physical encumbrance. The transmitter with an aerial is carried by a protective handle having actuating means effective for selective operation of the transmitter associated with the receiver. Transistorized circuitry assures compact control of drive and speed of dental work tools with multi-channel operation including a step-by-step switching relay with delayed energization in an infinitely variable manner within particular transmitter impulse range.

---

The present invention relates to a device for treating teeth, which device comprises a handle-equipped mouth mirror and at least one energy supplied treatment tool, especially rotary treatment tool.

Dental tools, such as electric drilling machines, air turbines, air motors, and ultrasonic devices for the treatment of patients, are almost exclusively started and controlled by foot operated lever means. By the operation of such foot lever means or foot control, with electric drilling machines, the speed and direction of rotation are controlled. The foot control is usually arranged adjacent the dental treatment chair on the floor and is connected by cable to the unit containing the drilling machine and other dental tools. As foot controls, there are also known so-called flat starters with which the speed and direction of rotation, for instance of a drilling machine, can be preselected by keys, whereupon by actuation of the flat starter by means of the foot, the turning-on and turning-off can be effected. With flat starters of this type, also air turbines, air motors and ultrasonic devices of dental tools are controlled. These known foot operable devices frequently affect the health and wellbeing of the dentist inasmuch as they require the displacement of the body weight of the dentist so that he has to stand on one leg. As a result thereof, bending of the spine, disturbance of the blood circulation in the legs, overfatigue, and the like may occur.

Furthermore, a foot operable device, due to its limited movability, also limits the dentist to a certain area while on the other hand said foot operable device requires a relatively large space between the dentist and the chair. The limited movability of the dentist also impairs a relaxed position of the patient.

Efforts have been made to employ manually operable controls which comprise a yoke which is adapted to be placed on the palm and extends around the hand from both sides while having connected thereto a switch located on the palm and operable by the fingers of the same hand. This manually operable control device can be operated by the dentist's hand holding the mouth mirror but causes strains in the hand so that the mirror or any other accessory tool cannot be held quietly and safely. Furthermore, such manual switch cannot be quickly detached from the hand as it may be necessary under certain circumstances. Since the manual switch is by means of a cable connected to a relay or the like for use in connection with the switching on and the control of the drive motor of the dental tool, a hindering of the dentist's operations by such manual switch cannot be avoided.

It is, therefore, an object of the present invention so to design a dental mouth mirror with a handle that a simple control of the drive of at least one dental energy driven tool will be assured.

It is another object of this invention to provide a dental mouth mirror as set forth in the preceding paragraph in which the desired control of the driving energy can be effected in conformity with the requirements completely independent of the drive so that the dentist can move completely freely.

These and other objects and advantages of the invention will appear more clearly from the following specification in connection with the accompanying drawings, in which:

FIG. 1 diagrammatically illustrates in elevation a dental mouth mirror according to the invention equipped with a remote-controlled transmitter.

FIG. 2 is a longitudinal section through the mirror of FIG. 1.

FIG. 3 is a partial longitudinal section through a portion of the transmitter.

FIG. 6 is a diagrammatic representation of the holding means equipped with switches and respectively pertaining to the individual tools.

FIG. 7 is a circuit for the receiver part of the remote control for three different tools.

Figure 8:
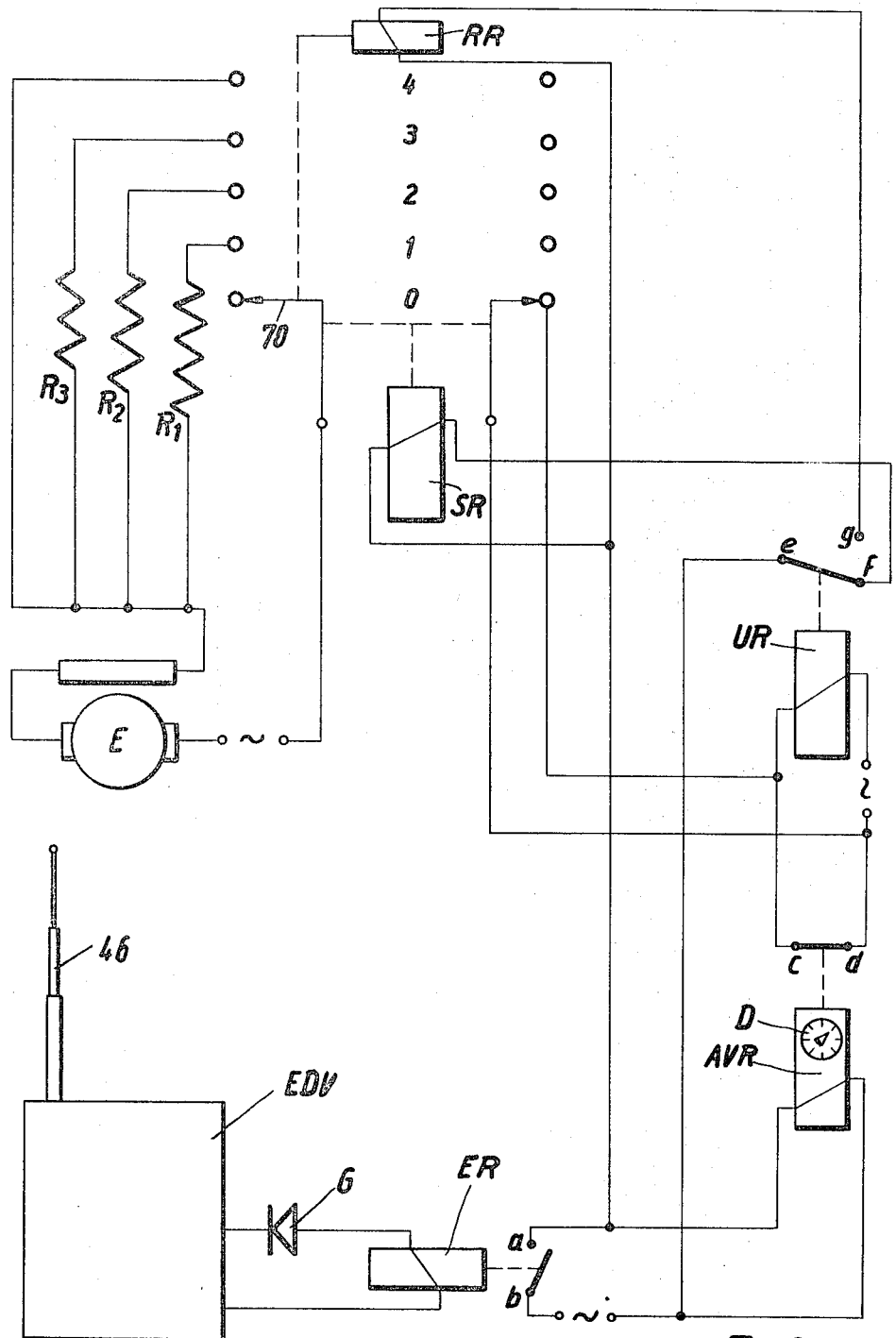
FIG. 8 shows the circuit of a receiver in which by a succession of impulses by means of a step-by-step switch or stepping mechanism and by means of a relay with delayed switchoff, different velocity steps can be adjusted for a dental electric drilling machine.

FIGS. 9a and 9b respectively represent two diagrams for explaining the operation of the device according to FIG. 8.

Figure 10:
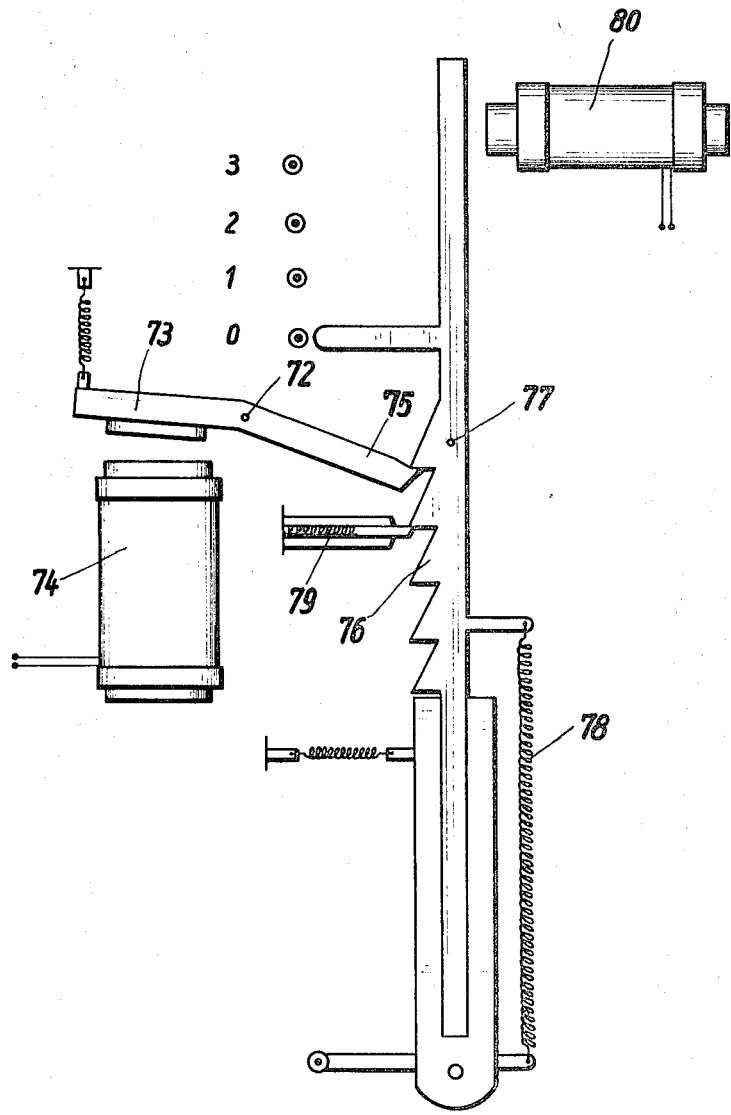

FIG. 10 represents an example for a step-by-step relay as it may be used in connection with the arrangement of FIG. 8.

Figure 11:
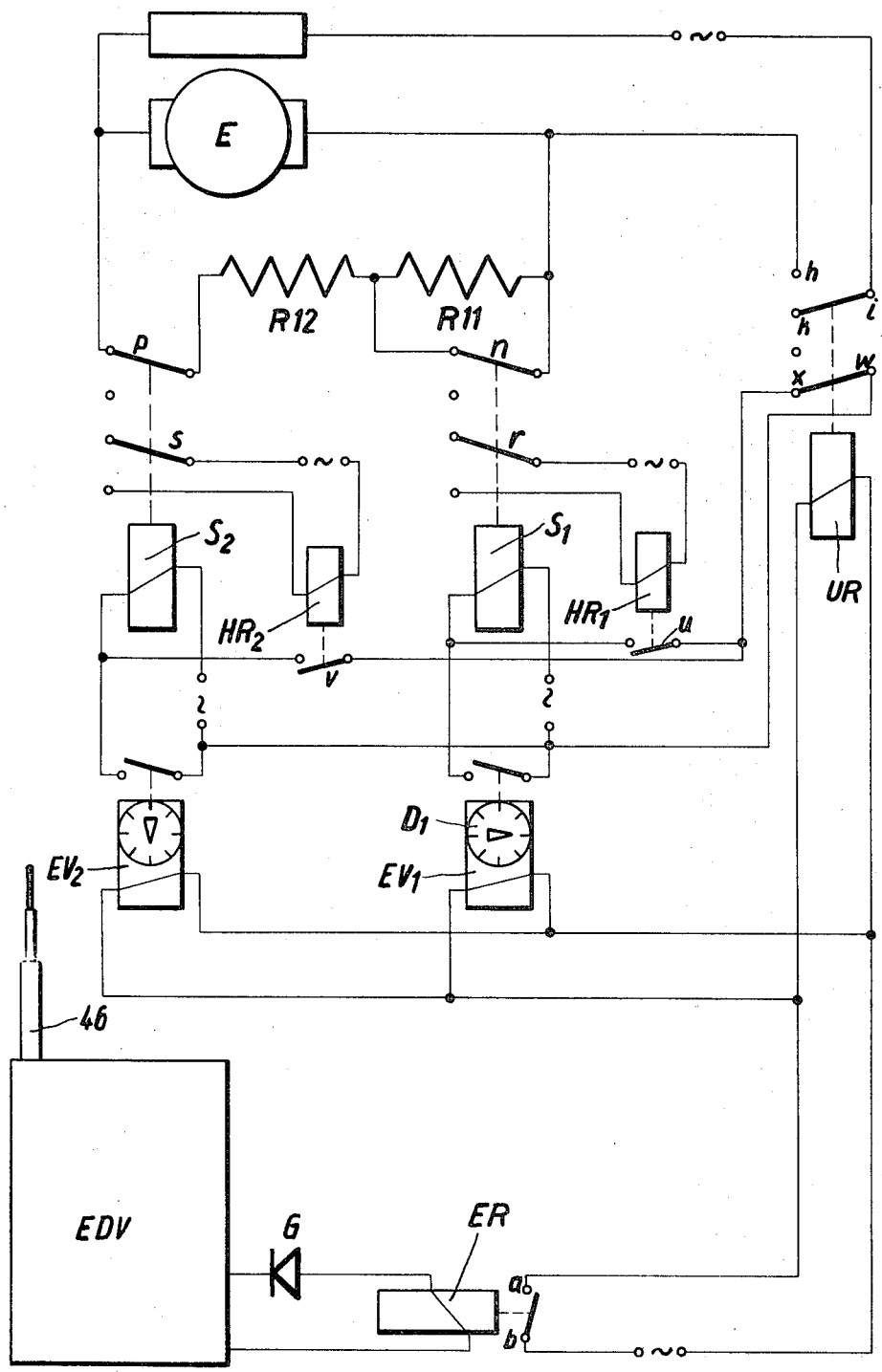

FIG. 11 illustrates the circuit of another receiver in which due to the duration of the emitter impulses by means of a relay with delayed switch-on it is possible to set the dental electric drilling machine for one of a plurality of velocity steps.

Figure 12:
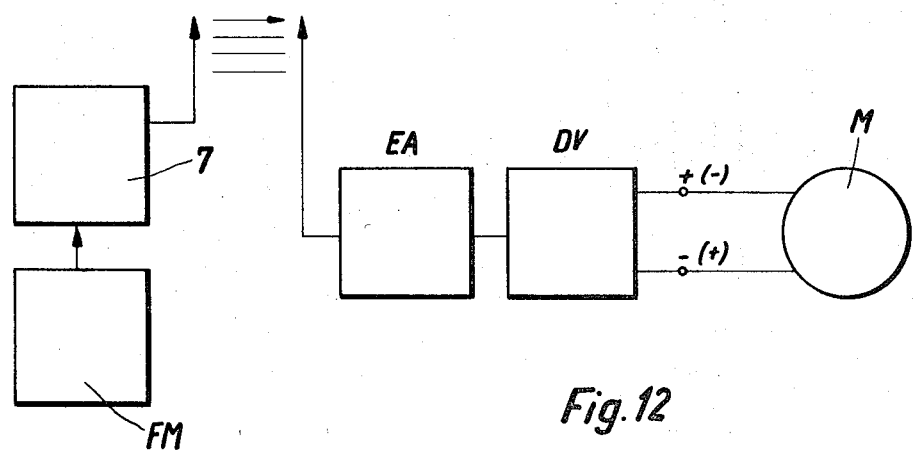

FIG. 12 is a block diagram for another remote control according to which a stepless proportional control for a direct current motor is obtained by frequency modulation.

Figure 13:
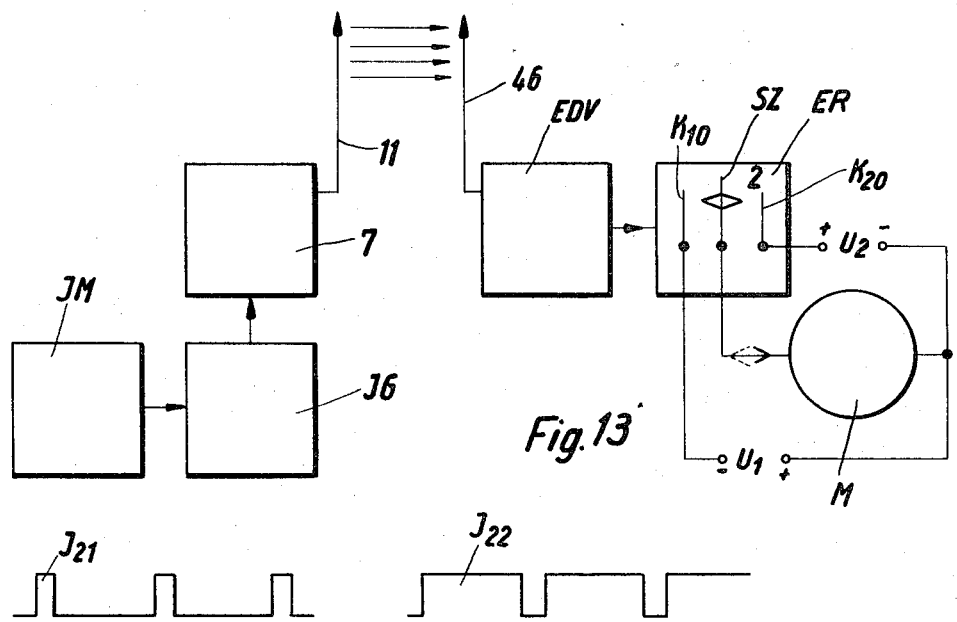

FIG. 13 represents a block diagram of a modified receiver in which a stepless proportional control for a direct current motor is obtained by means of impulse-width modulation.

FIGS. 14 and 14a respectively illustrate an impulse sequence with long and short impulse-intermission ratio.

A dental mouth mirror with handle according to the present invention is characterized primarily by the provision of a remote-controlled transmitter for the control of a drive operatively connected with a receiver and serving for the operation of a dental tool while at least one manually operable means for actuating the transmitter is located within the area of the handle. The drive of the dental tool is thus controlled in a wireless manner so that between the mouth mirror or remote-controlled transmitter to be held by hand, on one hand, and the receiver controlling the drive, on the other hand, no mechanical connection is required and consequently the dentist can move freely while still being able to switch-on and switch-off the drive and to control the same as to its speed.

According to a further feature of the invention, the transmitter is arranged at the rear end of the preferably sleeve-shaped handle so that the transmitter cannot be interfered with when working with the mirror. Advantageously, the transmitter is arranged in the handle sleeve so as to be protected thereby. However, if desired, the transmitter may also form an extension of the handle while its longitudinal extension is expediently longer than its transverse dimension so that it forms a kind of streamlined extension of the handle.

In order to assure a safe wireless connection between the transmitter and the receiver, expediently, the rear end of the handle or transmitter portion is provided with a transmitter aerial. Instead of this aerial or in addition thereto, there may also be provided a transmitter aerial on the circumference of the transmitter part while the transmitter aerial is expediently at any rate located in the longitudinal axis of the handle or parallel to said longitudinal axis. Also a further space saving arrangement of the transmitter aerial in the interior of the transmitter housing or at the circumference thereof is possible, for instance, in the form of a coil with a suitable number of windings. The means for operating the transmitter can easily be actuated when they are formed by at least one pushbutton, one ring, one step switch or the like, in the vicinity of the front end of the handle. Advantageously, the actuating means are distributed over the circumference of the handle so that they are equally easily accessible. When employing a step switch or a plurality of actuating means, it is possible in addition to switching-on and switching-off the drive of the respective dental tool, also to control the speed thereof and its direction of rotation, or the frequency and intensity of for instance the water cooling system.

In order to be able easily to sterilize the dental mouth mirror, the transmitter part can be detached from the handle. To this end, the transmitter part may, in an advantageous manner, be slipped onto the rear end of the handle. When the actuating means for actuating the transmitter are separate from the transmitter part, for instance, are provided on the handle, it is possible to provide between the transmitter and the conductors provided with the contacts of the actuating means suitable detachable contacts, as for instance plugs, or engaging contacts so that special assembly operations, when detaching and reassembling the transmitter part, will not be required. The correct position of the transmitter part or its contacts with regard to corresponding counter-contacts will be assured in a simple manner by suitable centering means. For instance, a so-called coaxial plug may be used for this purpose.

According to a preferred embodiment of the invention, the mirror is detachable from the handle, for instance, by unscrewing so that on one hand an exchange of the mirror and on the other hand, when the mirror has been detached, the exclusive employment of the transmitter part for controlling the drive will be possible. In certain instances it may occur that a mouth mirror is not required at all. Instead of the mouth mirror, if desired, another dental tool may be connected to the handle.

The battery or batteries, the button cells (Knopfzellen) or the chargeable accumulator batteries for operating the transmitter may, for purposes of saving space, be arranged within the handle.

In order to obtain a miniaturized transmitter part, the latter is provided with transistors or is fully transistorized.

In order to permit a plurality of control operations, as for instance the control of the switching-on and switching-off, and the control of the speed or the frequency of one or more driving motors of additional tools, the transmitter may comprise two or more channels while the receiver is correspondingly designed for a plurality of channels.

In order to design the transmitter as small as possible or with a low number of transmitter channels to be able to carry out a multiplicity of control operations, it is advantageous within the holding means for receiving one or more dental tools, to provide small selector switches by means of which the remote control device will be connected to the respective tool to be used.

According to a further development of the invention, for simplifying the transmitter part in the mouth mirror and also for simplifying the receiver part operatively connected thereto, the control of a plurality of control operations of a dental tool is effected by means of a single remote-controlled channel, and the remote-controlled transmitter therefore need be designed only with one channel. This has been realized according to the present invention by having step-by-step relay with return setting mechanism associated with the transmitter part. The said step-by-step relay will in view of the emitted impulses coming from the mirror transmitter and reinforced in the receiver occupy successively one control position after another of a plurality of control positions. In this way, a stepwise control of the respective drive will be possible in a wireless manner also with a transmitter having one channel only. Thus, for instance, the switching-on and switching-off of the dental electric drilling machine as well as the selection of a plurality of velocity steps of said drilling machine can be effected by the step-by-step relay.

The step-by-step relay has at least two or more control steps the number of which will depend on the respective requirements during the operation of the respective tool. The said relay has a single switch-off position and a plurality of successive working positions. Furthermore, the said relay comprises a separate return setting mechanism. If a current impulse is sent to a separate magnetic coil in the relay, the latter returns to its switched-off position.

In conformity with the present invention, in addition to the step-by-step relay, there is also provided a relay with delayed switch-off the energizing period of which can preferably be adjusted in an infinitely variable manner within certain limits. Said relay with delayed switch-off will be switched-on immediately in response to a current impulse and after the expiration of the delaying period will switch-off. This time delay relay brings about that after a previously adjusted running period, each further transmitter impulse will return the step-by-step relay to its switched-off position in which, for instance, the electric drilling machine is switched-off and no further switch over to the next higher speed stage is effected.

When quickly succeeding transmitter impulses are emitted by the mirror transmitter and occur within the adjusted running period of the time delay relay, the step-by-step relay is stepwise advanced to the next working control positions.

The advantage of this arrangement is seen in the fact that by means of a simple one channel transmitter which can be easily handled and has a battery saving impulse operation, it is possible to bring about a plurality of control operations. In a simple manner, the dentist can by pressing once, twice or three times the contact button on the mouth mirror transmitter set the velocity stage 1, 2 or 3 of the electric drilling machine. After a short adjustable waiting period, a further contact pressure switches off the drilling machine.

According to a further modification of the present invention, the step-by-step control relay on the transmitter side is replaced by a plurality of start-delay relays the number of which will depend on the number of the desired control steps.

If an exciting voltage is placed on a time delay relay, also after a certain delaying period a switch-on switch is actuated. This delaying period may by means of a potentiometer be adjusted in an infinitely variable manner within certain limits. In order to prevent a plurality of short exciting impulses, which are less than the adjusted time period, from adding up and causing the relay to switch-on, the latter is expediently equipped with a so-called automatic time extinguishing mechanism.

The time delay relays are built into the receiver part of the arrangement and become active with a switched-on impulse which has been deliberately emitted over a longer period of time. These relays will then, for instance through the intervention of resistors, set the electric drilling machine for the next velocity stage.

A control arrangement which is designed, for instance, for four velocity stages must have three time delay relays of this type. These relays may be, for instance, so adjusted that a switch-on impulse of the mirror transmitter of from $0-2/10$ second duration will set the electric drilling machine to stage 1 (rather slow), whereas a switch-on impulse of from $2/10-4/10$ second duration will set the drilling machine to stage 2 (slow); an impulse of from $4/10-6/10$ second duration will set the drilling machine to stage 3 (medium speed), and an impulse of in excess of $6/10$ second duration will set the drilling machine to stage 4 (fast).

Thus, with this embodiment it is possible by selecting the duration of the switch-on impulse to obtain the desired velocity stage. The arrangement advantageously operates in such a way that each switch-on impulse is followed by a switch-off impulse.

In conformity with the present invention, by associating auxiliary relays with the time delay relay, the circuit of the installation is so designed that each switch-off impulse sets back the electro switches to the time delay relays when the latter were actuated during a preceding control operation. As a result thereof, this arrangement will automatically start with stage 1 when being switched on anew.

A third modification of the present invention consists in that the wireless control, for instance of the speed of the drilling machine, is also possible in a stepless manner. To this end, the transmitter and receiver parts operate in conformity with the so-called proportional system and are designed accordingly.

With a remote control arrangement operating in conformity with the proportional system, the continuous change, for instance, of the carrier frequency of the mouth mirror transmitter is used for obtaining stepless changes in the voltage on the receiver side. This is brought about by a frequency modulator associated with the transmitter. By means of the capacitor of said frequency modulator, it is possible at will and in a fine manner to control the magnitude and the direction of the output voltage on the receiver side. The receiver side will with this embodiment comprise a so-called discriminator which converts the changes in the modulation frequency received by the receiver into continuous voltage changes. The said discriminator is advantageously equipped with transistors.

Also continuous variation of the time values of the impulse sequence produced by the transmitter may advantageously and analogously be employed for the same purpose. To this end, the mirror transmitter comprises an impulse generator and an impulse modulator which make possible a continuous variation of the relationship between impulse duration and impulse intermission. The transmitter part of this arrangement has associated therewith a demodulator which conveys to a relay the impulses which on the receiver side have been reinforced and rectified. This relay which is arranged in two direct current circuits brings about that, depending on the impulse-intermission-ratio, an alternately flowing direct current will result which, for instance with an electric motor, will permit continuous speed changes.

The mirror and transmitter of this embodiment are so designed that suitable contact makers, for instance through a transmitting mechanism in the mirror handle, bring about the above mentioned stepless variations in the modulation frequency or impulse sequence.

A proportional control arrangement may, for instance, bring about the stepless adjustment of all drilling machine speeds up to the standstill of the machine. In addition thereto, also a reversing of the speed is obtainable.

Referring now to the drawings in detail, a dental mouth mirror according to the present invention comprises a sleeve-shaped handle 1 having its front end 2 tapering conically. At the conical end 2 and coaxial thereto there is provided an inner thread 3 detachably engaging a corresponding thread section 6 of an arm 5 which holds the mirror head 4.

The rear end of the cylindrical sleeve-shaped handle 1 has connected thereto a transmitter 7 through the intervention of a plug coupling 8. One coupling member 9 of said coupling 8 is connected to the rear end of sleeve 1 whereas the other coupling member 10 is connected to the front end of the housing for the transmitter 7. The transmitter 7 has a diameter or cross-section which is only slightly larger than that of the handle 1 while the transmitter 7 is located within the area of the axis of the handle 1. The rear end of the transmitter 7 is provided with an aerial 11 which is substantially coaxial with the handle 1 and freely protrudes therefrom. Instead of this aerial 11 or in addition thereto there may also be provided an aerial 12 on the circumference of the transmitter 7. The aerial 12 likewise extends preferably in the longitudinal direction of the handle 1. In addition thereto, at least one of the said aerials, or as sole aerial, there may be provided a helical coil or coil-shaped aerial 13 which may, for instance, be arranged on the inside of the housing for the transmitter or at the circumference thereof.

In the front region of the handle 1 at a suitable location behind the conical end 2 there are provided a plurality (in the drawing three) actuating means 13–15 in the form of pushbuttons or the like which are uniformly distributed over the circumference of the handle 1. The said actuating means 13–15 have all the same distance from the front end of the handle 1 and are connected to contacts located in the handle 1 but not shown. By actuating the actuating means, the said contacts can be closed or opened so that the corresponding channel of the multi-channel transmitter 7 will be actuated. The ends of the conductors connected to the contacts of said actuating means 13–15 are expediently electrically connected to corresponding contacts of the coupling 8 so that the disengagement and engagement of these contacts will be effected when actuating the plug or screw coupling 8.

If the receiving installations described further below it is possible, by employing one step-by-step relay or a switch-over relay, to effect the control of the tools pertaining to the treatment device and shown in FIG. 6, by means of a single high frequency channel, it is expedient in conformity with the embodiment of FIGS. 2 and 3 to mount the transmitting device 7 in a housing 17 of synthetic material. This housing 17 comprises a neck 18 designed as coaxial plug which neck 18 contains the batteries 19 in the form of button cells which serve as current source for the transmitter. In a structurally very simple manner, the circuit can be closed by means of the pushbuttons 13, 14, 15 for emitting a control impulse when at the end face of the neck 18 a contact pin 20 is provided which with the inserted transmitter part extends between the said contact buttons. By means of a metallic threaded ring 21 provided at the other end of the housing 17, which may be of synthetic material, it is possible for actuating the transmitter to establish the current flow through the metallic handle of sleeve 1 and the depressed contact button.

Figure 4:
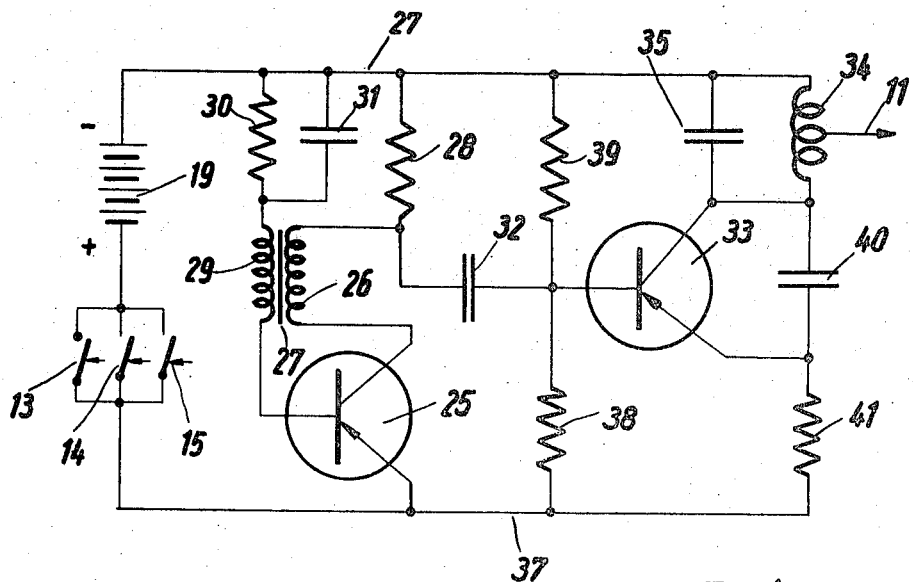
FIG. 4 shows a circuit of the transmitter.

The miniature transmitter 7 may be designed as a one-channel transmitter, advantageously in conformity with the basic circuit shown in FIG. 4. In conformity therewith, a small pnp-transistor 25 serves as low frequency sound generator the collector of which has connected thereto the primary winding 26 of a transformer provided with an iron core 27. The said primary winding 26 is connected to a minus line 27 through a resistor 28. The secondary winding 29 of the transformer leads from the base of this transistor through a resistor 30 and a condenser 31 parallel thereto into the said minus line 27. From the connecting point of the primary winding 26 with the resistor 28, a coupling condenser 32 leads to the base of the second pnp-transistor 33 which serves as high frequency generator and has its collector connected to an oscillating coil 34 and a condenser parallel thereto. The aerial 11 branches off approximately at the center of the oscillating coil 34. Two resistors 38 and 39 acting as voltage divider and located between the minus line 27 and the plus line 37 and a condenser 40 located between the collector and the emitter of the transistor 33, and an emitter compensating resistance 41 supplement the circuit in such a way that by closing one of the contact buttons 13, 14 and 15, the miniature transmitter can be closed to give off one or more control impulses.

Figure 5:
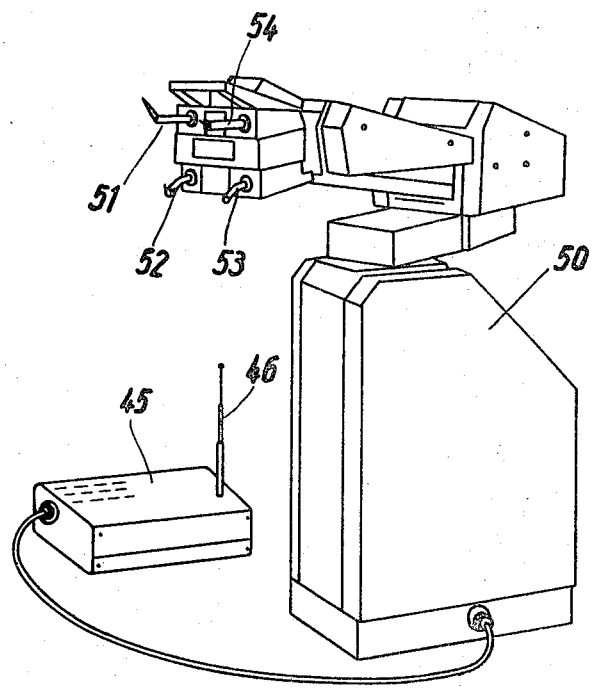
FIG. 5 represents an isometric view of a so-called dental unit comprising a plurality of dental tools.

The high frequency transmitter which, in conformity with FIGS. 1–3, is located in the handle 1 of the mouth mirror cooperates with a receiver which in the manner shown in FIG. 5 can be connected to a dental treatment device which forms a dental unit. Such dental unit comprises a plurality of instruments 51–54 serving as treating tools. Some or all of said instruments will be provided with energy, especially electric current or compressed air, from the socket 50 of the dental unit.

The receiver part of the control arrangement comprises in the receiver housing 45 a high frequency receiver with built-in network part which likewise is supplied from the socket 50, and furthermore comprises control relays not shown and compensating resistances as well as an extendable aerial 46 for the control impulses emitted by the transmitter of the above described mouth mirror. It is by means of this control impulse that the individual instruments, in case of need, are switched-on and switched-off and are affected in their work.

According to the diagram shown in FIG. 6, it is assumed that three instruments pertaining to the dental unit of FIG. 5 are to be remote-controlled in a wireless manner. These three instruments are represented by a compressed air fed turbine drill 52, an electric drilling machine 53 with a miniature motor 55 on its handle, and an ultrasonic generator 54 mounted in a handle. The generator 54 may, similar to the electric motor 55, be provided with current from the socket 50 of the dental unit.

Each of the above mentioned instruments 52–54 will, as long as it is not needed, be located in a container 56, 57, 58 in the shape of a round length casing. In order to be able to keep the transmitter as small as possible, or to be able to carry out a plurality of control operations by means of a single emitting channel, according to the embodiment shown in FIG. 6, miniature switches 60, 61, 62 are provided in the said containers 56, 57, 58 intended for receiving the above mentioned dental instruments. The minature switches 60, 61, 62 extend by means of a feeler pin into said containers 56, 57, 58 respectively and are held in their open position as long as their pertaining instrument is in said container or holding means, and are moved to their closing position as soon as one of these instruments is withdrawn from said container 56, 57, 58 for use on a patient. To this end, in conformity with the circuit of the receiver shown in FIG. 7, the high frequency oscillations received by the receiving aerial 46 are amplified in the receiver EDV, are then demodulated, and the thus obtained low frequency voltage is after renewed amplification transmitted through the intervention of a rectifier G to a receiver relay ER. The control contacts of said last mentioned relay are arranged in an alternating voltage receiving circuit to which through the intervention of one of the miniature switches 60, 61, 62, one of the electromagnetic switches 64, 65, 66 is connected. Of the switches 64, 65, 66 the switch 65 is arranged in the circuit of the electric drilling machine 53 whereas the switch 66 is located in the circuit of the ultrasonic device 54. The non-illustrated armature of the electro-switch 64 cooperates with the non-illustrated slide of a valve 67 which is located in the compressed air feeding line 68 (FIG. 6) of the air turbine 52. Inasmuch as always only one of the instruments is in use and is supplied with the necessary energy through a pertaining miniature switch and the respective electro-switch, a single transmitting channel will suffice in spite of the plurality of the instruments. The electro-switches 64–66 may be designed in various ways and, for instance, may operate against the thrust of a return spring. In such an instance, however, it is necessary that the control impulse emitted by the transmitter of the mouth mirror will be maintained as long as the instrument removed from the respective container is to be driven or supplied with energy. However, expediently, electro-switches are employed which alternately switch-on in response to short impulses and switch off during the next impulse. In this way, it is not necessary, when putting dental instruments into operation, to maintain the contact buttons on the mirror handle continuously depressed.

In order to avoid a premature exhaustion of the batteries mounted in the handle of the mouth mirror and intended for supplying current to the transmitter, it is suggested to operate the transmitter in conformity with the impulse method while either for initiating discrete control operations a sequence of impulses is employed with a number of impulses corresponding to the desired control operation, or with an impulse of different duration, while the desired control operations have associated therewith impulses of a predetermined impulse duration.

FIG. 8 illustrates the circuit of a control arrangement operating with an impulse sequence by means of which a dental electric drilling machine E can be turned-on and turned-off and can be set for any one of four different drilling speeds. More specifically, similar to the embodiment of FIG. 7, the high frequency receiver EDV has through a rectifier connected thereto the receiver relay ER. This receiver relay ER is excited and moves the control contacts a, b to their closing position only as long as the transmitter 7 by means of depressing one of the contact buttons 13, 14, 15 is caused to emit a short control impulse of a duration of for instance from 0.2 to 1 second. For the duration of this closing condition, the contacts a, b connect the step-by-step control mechanism SR as well as a time relay AVR with delayed switch-off with a source of alternating current. The said relay AVR will immediately turn on in response to each control impulse bringing about the closure of the contacts a, b and will retain its turned-on position until the delaying time has expired. This delaying time can be infinitely variably adjusted by means of a rotatable knob D within certain limits, for instance, from 1 second to 5 seconds. The contacts c, d of this relay will with each closing step convey a current impulse to a switch-over relay UR. With each current impulse, the switch-over relay moves from one of its two stable control positions e, f to the other stable control position e, g. The step-by-step control mechanism is connected to the contact f and can by means of the closing contacts a, b of the receiver relay with each transmitter impulse be switched successively from 0 to the stages 1, 2, 3 and 4 at which the control arm 70 connects a dental electric drilling machine E through compensating resistances R1, R2, R3 to the supply alternating current network, and in stage 4 directly to the alternating current network. It will be appreciated that the compensating resistances R4, R2, R3 decrease from stage to stage. In order to assure at the start of such impulse sequence that the step-by-step relay will be in the starting position zero, there is provided a return relay RR the coil of which is connected to the other switch-over contact G of the switch-over relay UR. When the step-by-step relay, after emitting the corresponding number of short control impulses, has reached the position corresponding to the desired stage, and when the delaying time of the relay AVR has expired in the meantime, the next initiated control impulse of the transmitter will bring about that the switch-over relay switches over from the illustrated position which prevails during the actuation of the step-by-step relay and thereupon through the contacts e, g of the return relay RR to the receiver relay ER. When in this way an impulse reaches the return relay, the step-by-step relay will by the thrust of a return spring return to the starting position zero in which the electric drilling machine E is turned-off.

For purposes of explaining the operation, attention is directed to FIGS. 9a and 9b in which it is assumed that at a time t1 the transmitter is turned on and then furnishes a short individual impulse I1 up to the time t2 while at the time t1 the contacts a, b of the receiver relay ER close, and at the time t2 again open. Likewise at the time t1, the contacts c, d of the time delay relay AVR close and remain closed for the delaying time indicated in FIG. 9a with the character Tv up to the time T10. During this delaying time and beyond the same up to the time t11 of a new impulse I10, the switch-over relay remains in the position it had reached at the time t1 in which its contact f is connected to the contact e. By means of the single control impulse I1 which arrived during the delaying time, the step-by-step relay SR can be advanced only from zero to the first control stage. If, however, in the manner illustrated in FIG. 9b, still further control impulses I2, I3 and I4 are effective during the delaying time Tv of the time delay relay AVR after the first control impulse, the step-by-step relay SR is with each of these impulses advanced step-by-step by one step each up to the stage 4 in which the electric drilling machine is directly connected to its supply current source and runs at its maximum speed. This operation is continued at will beyond the expiration of the delaying time Tv until, for purposes of stopping the drilling machine, a new control impulse I10 is given off at the time t11. At that time, the switch-over relay UR switches to the contact g and makes the return relay RR effective which then returns the step-by-step relay SR to its starting position 0. If, after the expiration of the delaying time Tv brought about by the impulse I10, at the time 21 a new control impulse I11 and a second control impulse I12 following the impulse I11 is produced, the step-by-step control mechanism will, as shown in the right-hand portion of FIG. 9b, be switched to the stage 2.

FIG. 10 diagrammatically illustrates an embodiment of the step-by-step relay for use in connection with the arrangement of FIG. 8. This step-by-step relay, however, in addition to comprising the switch-off position zero, has only three switch-on steps 1, II and III. More specifically, the step-by-step control mechanism has a two-arm armature 73 which is pivotable about a pin 72, and furthermore has an electromagnet 74 for cooperation with said armature 73. The winding ends of the electromagnet 74 are adapted in the manner evident from FIG. 8 to be connected to the contact a of the receiving relay ER or to the contact f of the switch-over relay UR. The free lever end 75 of the armature 73 engages one of the teeth 76 from behind, said teeth 76 pertaining to a rack 77 which is continuously urged by a return spring 78 to move in the direction of the arrow shown in FIG. 10. The armature 73 is adapted against the thrust of said return spring 78 to lift the rack 76 by one tooth in response to each control impulse while a spring-urged locking pin 79 springs forward behind the next tooth only to such an extent that the rack 77 is held in its respective stroke position and that the rack by a slight pivoting in clockwise direction can be released from this locked position. Such movement is imparted upon the rack 77 when the magnetic coil 80 of the return relay RR is brought into contact with the supply source of current through the shift-over contact g, e. Thereupon, the rack 77 is by its return spring 78 returned to its starting position.

In contradistinction to the just described receiving device which responds to the respective number of individual impulses pertaining to an impulse sequence, the embodiment of FIG. 11 operates independently of the respective duration of the control impulses emitted by the transmitter which control impulses are by the receiving aerial 46 of the high frequency receiver EDV after demodulation and amplification conveyed through the rectifier G to the receiving relay ER. With each control impulse, the contacts a, b of the receiving relay ER close and then connect a shift-over relay UR as well as two time delay relays EV1 and EV2 operating with a switch-on delay, with a source of control current not illustrated. With each control impulse, the shift-over relay moves to another position and connects the electric drilling machine E with its source of operating current through the contacts i, h occupying a closing position, or the shift-over relay separates the electric drilling machine from its source of operating current when the switch arm i during the movement of the relay to another position reaches the contact k. While, however, the switch-over relay UR already at the start of each control impulse changes its control position, the switch arm m of the time delay relay EV1 moves to its closing position only when the control impulse has a duration exceeding the delaying period adjusted by the turning knob D1, for instance, by 0.5 second. In such an instance, also the electro-switch S1 is closed which in its rest position bridges a resistor R11 by means of the control arm n. The said resistor R11 is serially arranged with a second resistor R12 and by means of a switch arm p of a second electro-switch S2 is in parallel to the armature of the electric drilling machine E. The electroswitch S2 is actuated by the time delay relay EV2 and turns off the parallel circuit by its switch arm p through the resistors R11 and R12 only when the impulse emitted by the control transmitter keeps the contacts a, b of the receiving relay ER closed behind the delaying time set by the time delay relay EV2, for instance for a period of 1 second. In view of the stepped delaying time of 0.5 second on the first time delay relay EV1 and of the delaying time of 1 second on the second time delay relay EV2, there is obtained the possibility by depressing one of the keys 13, 14, 15 on the mouth mirror for a longer or shorter period to actuate either the shiftover switch UR alone or together with the electroswitch S1, or also together with both electroswitches and thereby to select the speed of the drilling machine.

The time delay relays EV1 and EV2 may be equipped with a mechanical clockwork adapted to be set for the desired delaying time or may be equipped with an electronic delaying device, as for instance a cold cathode tube. In this connection it is advantageous to have the possibility of adjusting the delaying time at least within a certain range. The electroswitches UR, S1 and S2 are equipped with double synchronously movable contact arms and also with double contacts. By means of these second contacts of the switches S1 and S2, the auxiliary relays HR1 and HR2 are connected to a source of current. Consequently, the contacts on the switch arms u and v will be closed when the electroswitches S1 and S2 are closed. If now a switch-off impulse moves the electroswitch UR to its position "off," a current impulse passes through the second control arm w and the control arms u and v of the auxiliary relay to the electroswitches S1 and S2 if said arms are in closed position. In this way it will be realized that each new control impulse which follows a control impulse effecting the switching on of the drilling machine will return the control device automatically to its starting position from which said control device in view of a new control impulse will start the electric motor E at a low speed through a first slow starting stage. The control arm n of the electric switch S1 will first occupy a rest position (shown in the drawings), but will be opened in response to a control impulse exceeding 0.5 second and will then by adding the resistor R11 reduce the parallel current until eventually with a duration of the control impulse exceeding 1 second, also the control arm p will open, whereupon the drilling machine is set to its maximum speed.

In contrast to the two last mentioned control devices, the embodiments of FIGS. 12 and 13 shown in a block diagram only, operate with a stepless proportional control for a direct current motor M. The transmitter 7 which similar to the above described embodiments is located in the handle of the mouth mirror may as to its frequency be changed by a frequency modulator FM which according to the simplest design comprises a stepless variable condenser or a plurality of condensers of different sizes which may be made effective selectively. In a manner well known in connection with the high frequency transmitting and receiving art, the transmitting frequency of the transmitter 7 may symmetrically to an intermediate frequency be variable within certain limits by manually adjusting an adjustable disc condenser or by turning-on and turning-off additional condensers by means of pushbuttons on the handle.

The high frequency waves emitted by the transmitter 7 are received by a receiver EA equipped with a high frequency amplifier, and after corresponding amplification and voltage limitation are conveyed to a discriminator DV. This discriminator will at its exit equipped with a rectifier give off a direct voltage which has a magnitude proportional to the deviation of the frequency of the emitted high frequency waves from the said intermediate frequency.

It is also possible by heretofore known means to assure that the direct voltage at the said exit is of a different polarity depending on whether the transmitting frequency is located above or below the intermediate frequency. It is particularly advantageous so to dimension the discriminator that it will furnish no voltage when its transmitting frequency equals the selected intermediate frequency but will furnish a negative voltage for the electric motor M when the transmitting frequency deviates in downward direction from the intermediate frequency, whereas the discriminator will furnish a positive direct voltage for the electric motor M when the transmitting frequency deviates in upward direction from the intermediate frequency. The magnitude of the said direct voltage is, regardless of its polarity, proportional to the frequency deviations adjusted on the transmitter. A particular advantage of such a design of a remote-controlled transmitter in the handle of the mouth mirror is seen in the fact that by a simple change in the capacity on the frequency modulator, the output voltage on the receiver side can be controlled as to magnitude and direction in any desired and fine stage manner. If, as is the case with the illustrated embodiment, the output voltage directly operates a direct current motor M or after a corresponding amplification, it is possible to remote control and adjust not only the speed but, if desired, also the direction of rotation of said motor.

Also with the remote control arrangement for dental tools and devices as illustrated in FIG. 13 in form of a block diagram, it is provided that the transmitter 7 arranged within the handle of a mouth mirror will transmit during the entire working period of the selected tool driven by a direct current motor M, however, in distinction over the above described embodiments, does not transmit according to the continuous-dash or continuous-wave signal method but according to the impulse modulation method which wears out the batteries in the handle to a considerably less extent. To this end, there is provided an impulse generator IG which during the impulses I21; I22 emitted thereby establishes connection between the transmitting stage and the batteries but during the intermission between two of these impulses is disconnected from the batteries.

The impulse generator IG is preceded by an impulse modulator IM by means of which it is possible to vary the ratio between the impulse duration bringing about a transmission of high frequency and the impulse intermission. This variation can be effected in fine stages by means of pushbuttons arranged on the handle of the mouth mirror or in a stepless manner by turning the handle.

FIG. 14 illustrates one of the extreme cases of adjustable impulse width-modulation according to which the impulses I21 are of only short duration whereas the impulse intermission lasts considerably longer. FIG. 14a illustrates the other extreme case according to which the transmitter impulses I22 which are brought about by the impulse generator and include a series of high frequency waves last considerably longer than the relatively short impulse intermissions.

The modulated high frequency waves emitted by the transmitter 7 through its aerial 11 in the form shown in FIGS. 14 and 14a pass through the receiver aerial 46 to a high frequency receiver EDV in which the received high frequency impulses I21; I22 after corresponding amplification and, if desired, voltage limitation are rectified and the receiving relay ER connected to the output of the receiver EDV receives a direct voltage from said impulses I21; I22. The said direct voltage, which in a manner analogous to the impulse width ratio illustrated in FIGS. 14 and 14a, will bring about a closing of a contact pair SZ, K10, K20, which will prevail during the impulses I21; I22.

If only a single contact pair SZ and K10 is provided which maintains connection between the drive motor for a dental instrument not shown during the duration of the transmitter impulses and a source of voltage, it is possible by means of the impulse width ratio adjusted on the transmitter handle, to vary the speed of this drive motor within wide limits, provided that the impulse sequence-frequency is considerably greater than the starting period constant of the motor M.

According to the illustrated embodiment, for purposes of driving a dental instrument not illustrated, there is provided a direct current motor which by its two connecting terminals is connected to the control arm SZ of the receiver relay ER. The other terminal is connected to the plus pole of a first direct current source U1 and is also connected to the minus pole of a second direct current source U2. The first direct current source is connected to the contact K10, whereas the second direct current source is connected to the contact K20. Furthermore, care is taken to the effect that only during the emission of high frequency impulses by the transmitter the control arm SZ engages the contact K10, whereas during the impulse intermissions the control arm SZ is moved into engagement with the contact K20 by means of a non-illustrated return spring. When the two direct current sources have the same starting voltage and if the impulse frequency is sufficiently high, the direct current motor M will stop because in the said instance the quantity of current passing per impulse period into the motor is of the same magnitude whereas the directions of the current are opposite to each other.

If, however, the ratio between the impulse duration and the impulse intermissions is reduced to less than 1, as is illustrated in FIG. 14, the motor M will in the direction of rotation determined by the voltage U2 of the second direct current source turn the faster the smaller the impulse intermission ratio is. The motor, however, turns in the opposite direction the faster, the longer the impulse duration becomes in the manner shown in FIG. 14a with regard to the impulse intermission. In this way it is possible in a very simple manner to adjust not only the speed of rotation of the motor but also its direction of rotation, and this control can be effected by means of the remote control transmitter 7.

It is, of course, to be understood that the present invention is not limited to the modifications shown in the drawings but also comprises modifications within the scope of the appended claims.

What I claim is:

1. A dental treatment apparatus encompassing, a mouth mirror provided with a handle in combination with an operating tool rotatable by means of an energy supply, said apparatus comprising: a remote control transmitter connected structurally with the handle of the mouth mirror, a receiver in the operating tool having wireless operating relationship with said transmitter and effective upon energy supply to operate the tool, and at least one actuating means for control of said transmitter and provided in the domain of the mirror handle.

2. A dental treatment apparatus according to claim 1, in which the handle has a hull-forming portion with a back end, and said transmitter is disposed particularly at the back end of the handle.

3. A dental treatment apparatus according to claim 1, in which the handle has a hull-forming portion, and said transmitter is disposed in said hull-forming portion.

4. A dental treatment apparatus according to claim 1, in which a hollow housing is provided for said transmitter and has a length greater than largest cross-sectional measurement thereof.

5. A dental treatment apparatus according to claim 1, in which the handle and said transmitter has a back end, and a transmitter aerial is provided at said back end.

6. A dental treatment apparatus according to claim 1, in which a transmitter aerial is provided peripherally of said transmitter.

7. A dental treatment apparatus according to claim 1, in which a transmitter aerial is located at least partially in a direction longitudinally of the handle.

8. A dental treatment apparatus according to claim 1, in which a transmitter aerial is wound in spiral form at least partially with respect to said transmitter.

9. A dental treatment apparatus according to claim 1, in which said actuating means of said transmitter is in the form of a manually movable switch located in forward vicinity of the handle.

10. A dental treatment apparatus according to claim 1, in which said actuating means is distributed peripherally of the handle.

11. A dental treatment apparatus according to claim 1, in which said transmitter is separable from the handle.

12. A dental treatment apparatus according to claim 1, in which said transmitter is fitted to the handle in rearward location.

13. A dental treatment apparatus according to claim 1, in which an arm coming to a head is provided between the handle and the mirror and is separable from the handle particularly at least by a turning movement.

14. A dental treatment apparatus according to claim 1, in which at least one energizing means for powering said transmitter is provided in the handle.

15. A dental treatment apparatus according to claim 1, in which said transmitter is transistorized.

16. A dental treatment apparatus according to claim 1, in which at least two channels are provided by said transmitter.

17. A dental treatment apparatus according to claim 1, in which a connector is provided to receive a particular instrument-mounting operating tool and upon removal therefrom for fitting the operating tool to said receiver.

18. A dental treatment apparatus according to claim 1, in which a single channel is provided for operation of said remote control transmitter, and a step-by-step switchable relay provided for said receiver serves for stepped connection to at least one dental operating tool.

19. A dental treatment apparatus according to claim 18, in which at least two switching steps are provided by said step-by-step switchable relay.

20. A dental treatment apparatus according to claim 18, in which a return mechanism is provided for said step-by-step switchable relay of said receiver.

21. A dental treatment apparatus according to claim 18, in which an adjustable delay relay means adjoins said step-by-step switchable relay and optionally effects forward switching of said step-by-step switchable relay in accordance with time difference of impulse of said transmitter and return positioning of said step-by-step switchable relay for disconnection of a dental operating tool connected with said step-by-step switchable relay.

22. A dental treatment apparatus according to claim 1, in which at least one relay with operating steps is provided for said receiver and is operable with adjustable delay proportionally in accordance with selection of at least one operating step.

23. A dental treatment apparatus according to claim 1, in which a switching relay works together with said receiver upon impulse-type operation of said transmitter though without change of switching position for duration of impulse of said transmitter.

24. A dental treatment apparatus according to claim 23, in which said switching relay upon transition to one of two switching positions thereof cancels previously work effective other switching positions.

25. A dental treatment apparatus according to claim 1, in which a stepless control device for continuously variable transmitter frequency is provided with said transmitter.

26. A dental treatment apparatus according to claim 1, in which an impulse-form-reset control means is provided for said transmitter and said receiver operable therewith, and impulse-width-modulating means is provided both for said transmitter and also for said receiver.

27. A dental treatment apparatus according to claim 25, in which a stepless proportional control means is provided for said receiver associated with said transmitter.

References Cited

UNITED STATES PATENTS

| 3,001,288 | 9/1961 | Freedman | 32—69 |
| 3,250,005 | 5/1966 | White | 32—69 |

ROBERT PESHOCK, Primary Examiner

U.S. Cl. X.R.

32—69